W. D. DE VAUGHN.
BAKER'S OVEN.
APPLICATION FILED JULY 21, 1909.
943,395.
Patented Dec. 14, 1909.
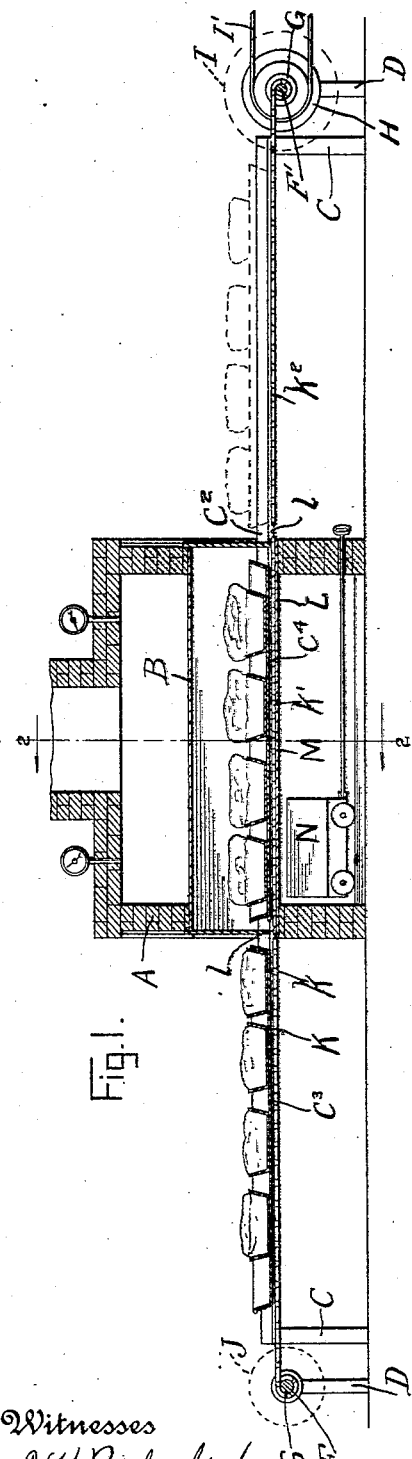
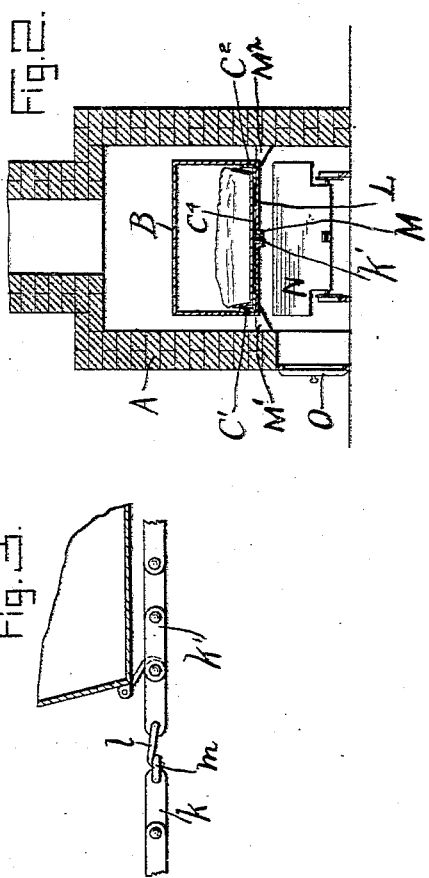
Witnesses
C. K. Reichenbach
W. H. Rockwell
Inventor
William D. DeVaughn
by Wm. H. Bates
Attorney

UNITED STATES PATENT OFFICE.

WILLIAM D. DE VAUGHN, OF BALTIMORE, MARYLAND.

BAKER'S OVEN.

943,395.  Specification of Letters Patent.  Patented Dec. 14, 1909.

Application filed July 21, 1909.  Serial No. 508,776.

*To all whom it may concern:*

Be it known that I, WILLIAM D. DE VAUGHN, a citizen of the United States, residing at Baltimore city, in the State of Maryland, have invented certain new and useful Improvements in Bakers' Ovens, of which the following is a specification.

My invention relates to improvements in mechanism for bread-baking ovens, and the object of the invention is to provide an oven with suitable mechanism through the medium of which the baking of bread is quickly and thoroughly accomplished, the loaves being always placed in separate pans and these pans removably placed in one or more metallic trays and the trays removably secured in series upon a flexible sectional chain or cable by means of hooks and eyes, said chain or cable being slidably passed through the oven. By this means the trays with their pans containing the unbaked loaves are continuously run through the oven back and forth. The first tray of pans with the dough or unbaked loaves when carried into the oven is allowed sufficient time to be baked when it is then removed and is immediately followed by the next tray, which when these are baked is also removed and other trays with their pans are then removably secured to the chain in a like manner and baked, and then removed. This is repeated until a sufficient number of loaves are baked.

With these and other objects in view, the invention consists in the novel construction and combination of parts as will be hereinafter more in detail described and the asserted novelty specifically claimed.

I have fully and clearly illustrated my invention in the accompanying drawings, in which, Figure 1 is a vertical longitudinal section of my improved device showing the operating mechanism in connection with the oven. Fig. 2 is a vertical section on line 2—2 of Fig. 1, and Fig. 3 is an enlarged detached view of one of the trays and a portion of the flexible sectional chain broken away to more clearly show the connections of the same.

Similar letters of reference indicate corresponding parts in the several views.

Referring to the drawings: A designates the brick-work, and B an oven, firmly secured and located within the brick-work in the usual manner, the upper portion of the brick-work being provided with thermometric gages for indicating the temperature of the oven, said brick-work and oven being of the ordinary or of an improved construction forms no part of my invention, and a further description thereof is herein deemed unnecessary.

C, C, designates uprights, upon the upper ends of which are secured the ends of L-shaped guide rails C', C² which fit snugly up against the inner sides and lower portion of the oven for supporting in connection with a flexible chain or cable, hereinafter more particularly described, one or more trays C³ C⁴ filled with removable baking pans, the trays being removably secured to said chain and run back and forth within and without each end of the oven.

D, D, designates shorter uprights located adjacent to the uprights C, C, within the upper ends of which is loosely mounted and journaled therein transverse shafts F, F' carrying midway their lengths drums G, G, the shaft F' being also provided with a differential pulley H upon one of its ends, and a crank or hand wheel I upon its opposite end, and an endless belt I' being passed over the pulley H for the application of a motor of any suitable kind if preferred for operating the shaft F'. Located upon one end of the opposite shaft F is also a hand or crank wheel J by means of which these shafts with their drums are operated when not using motive power.

K designates a flexible sectional chain or cable formed in three sections $k$, $k'$, $k^2$, the free or meeting ends of each section are provided with hooks $l$ and eyes $m$ for coupling and uncoupling the sections of chain or cable together when necessary, as more clearly shown in Fig. 3 of the drawings. The opposite ends of two of these sections $k$ and $k^2$ are secured to the drums G, G, respectively, and when the meeting ends of said sections are coupled with the section $k'$ a continuous chain is thus formed, the sections $k$ and $k^2$ being passed through and below the vertical end doors of the oven.

L designates the bottom plate of the oven, and formed longitudinally and centrally in this plate L is a channel M within which the chain or cable travels back and forward when wound upon or unwound from the drums by means of the hand or crank wheels which becomes necessary when delivering the pans of bread within or releasing them from the oven when baked.

M', M², designates stay rods by which the oven is rigidly secured to the brick-work inclosing the same.

N designates a traveling fire-box located within the brick-work A and below the oven B from which the heat is distributed to the oven in more or less degree as occasion requires. The movement of this fire-box is regulated at the discretion of the operator by means of the tongue or handle which is passed through the brick-work. An opening is formed in the brick-work provided with a door O by which the fire-box can be filled with fuel by the operator when necessary.

From the foregoing description taken in connection with the accompanying drawings the operation of my device will be obvious, but may be briefly rehearsed as follows: The trays which contain the pans of raw dough or unbaked loaves for baking are drawn within the oven by means of the slidable chain or cable by means of turning the handle of the hand or crank wheel mounted upon the end of the crank and pulley wheel shaft or by means of the band or pulley wheel to the location shown in the oven where it is baked; it is then further drawn out from the oven to the position shown oppositely to the loaves of bread shown in dotted lines by turning the hand wheel or crank shaft upon the opposite end of the oven when it is then thoroughly baked. This backward and forward operation of the cable is again repeated in opposite directions from one end of the L-shaped guides or rails to the other by means of the hand or crank wheels on the end of the transverse shafts as above stated.

What I claim as new and desire to secure by Letters Patent is:—

The combination in an oven, a bottom plate having a longitudinal channel formed therein brick-work provided with thermometric gages having vertical slidable doors located therein, a detachable cable slidably passed within said channel, trays located and detachably secured to and carried by the cable, pans located in the trays, guiderails for supporting and guiding the trays, uprights for supporting the crank and pulley shafts, crank shafts, wheels pulleys and a movable fire box located within the brickwork and below the oven.

In testimony whereof I affix my signature, in presence of two witnesses.

WILLIAM D. DE VAUGHN.

Witnesses:
   JOHN T. FARDY,
   DOUGLASS C. GOSNELL.